Figure 1:
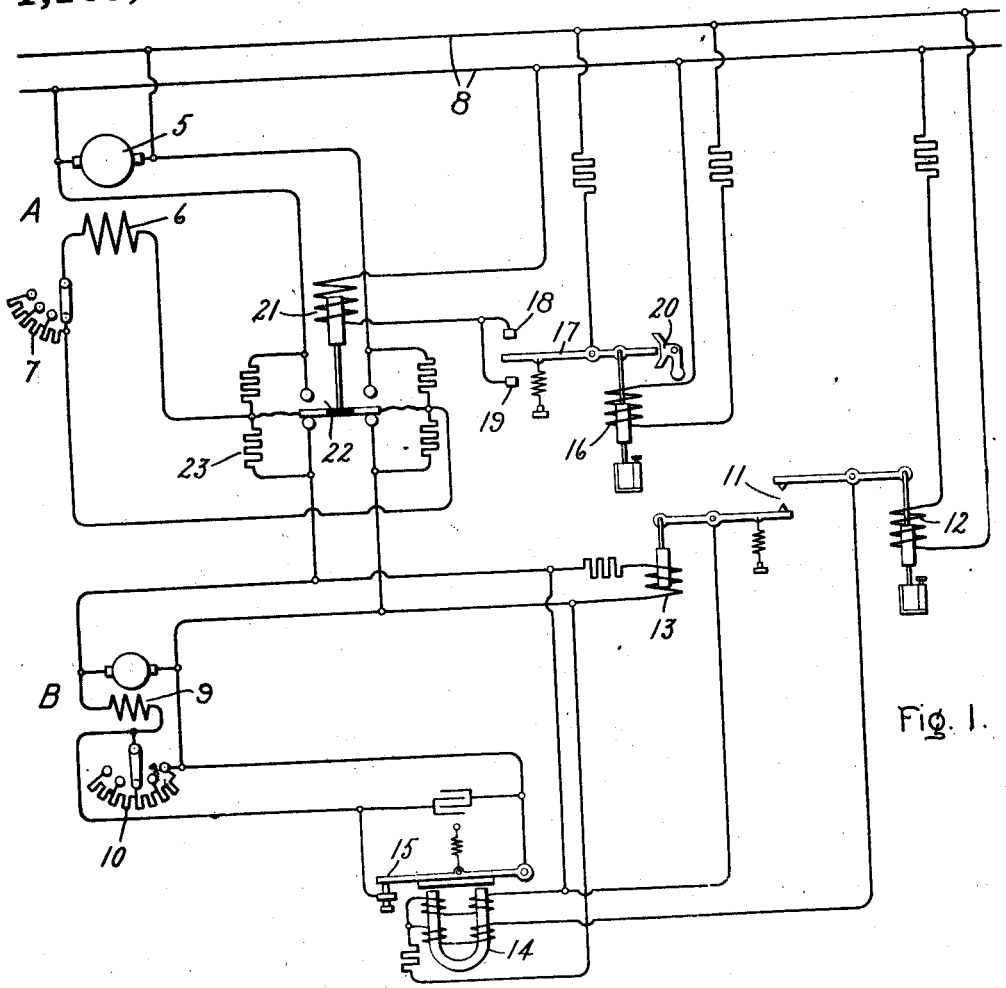

H. A. LAYCOCK.
CONTROL SYSTEM.
APPLICATION FILED FEB. 21, 1912.

1,109,235.

Patented Sept. 1, 1914.

WITNESSES:
J. Earl Ryan
J. Ellis Glen

INVENTOR:
HARRY A. LAYCOCK.
BY
HIS ATTORNEY.

UNITED STATES PATENT OFFICE.

HARRY A. LAYCOCK, OF SCHENECTADY, NEW YORK, ASSIGNOR TO GENERAL ELECTRIC COMPANY, A CORPORATION OF NEW YORK.

CONTROL SYSTEM.

1,109,235.  Specification of Letters Patent.  Patented Sept. 1, 1914.

Application filed February 21, 1912. Serial No. 679,018.

*To all whom it may concern:*

Be it known that I, HARRY A. LAYCOCK, a citizen of the United States, residing at Schenectady, in the county of Schenectady and State of New York, have invented certain new and useful Improvements in Control Systems, of which the following is a specification.

My invention relates to the control of electric distributing systems, and particularly to direct current systems wherein abnormal rise or fall of the voltage is likely to result from the imperfect operation of the voltage regulator.

The objects of my invention are broadly to provide means for protecting such systems from the effects of abnormal electrical conditions, and more specifically to provide a method of and means for protecting such systems from the effects of a sudden rise or fall of the terminal voltage of the supply generators and hence of the distributing line, in case the automatic voltage regulators, used in connection with the generators, become inoperative, or in any manner get out of order.

Voltage regulators of the well known Tirrill type employ two vibrating contacts. If these contacts fuse together or in any way become attached to one another, an abnormally small field will be maintained on the exciter and consequently on the generator, which will occasion a very large decrease in the terminal voltage of the latter. Again a broken wire may cause the excessive resistance used in the exciter field circuit in this type of regulator to be continuously short circuited and under such circumstances the voltage of the exciter and the terminal voltage of the generator will rise far above normal.

My invention eliminates these dangers and consists broadly in providing the generator field with two separate and independent means of excitation. When the system is working under its normal electrical condition, the field will be energized by the usual exciter set. Whenever the terminal voltage of the generator, and hence of the line, rises above or falls below predetermined values, the exciter is automatically cut out of circuit and the second source of generator field excitation is simultaneously inserted in the circuit. This second source of generator field excitation may be furnished by a storage battery or other external source of current, or by the generator itself, in which latter case the generator will be self-excited, but in any case the second source of excitation is unaffected by the voltage regulator used with the other source. The exciter is thus flexibly connected to the generator field and abnormal conditions in the former are not reflected on the latter.

For a more detailed understanding of my invention, reference is to be had to the accompanying drawings, in which—

Figure 2:
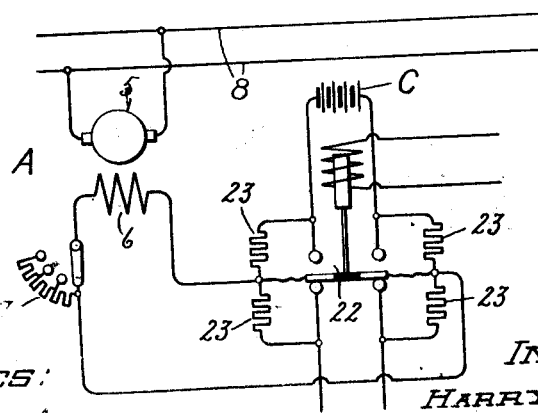

Figure 1 is a diagrammatic representation of a system provided with the novel features of my invention, and Fig. 2 is a modification thereof.

In the drawings, a generator A having an armature winding 5 and field winding 6 is shown connected to bus bars 8. The field circuit is provided with the usual regulating resistance 7. The generator field is normally energized by the exciter B having the field winding 9 and the regulating resistance 10. Coöperating with the exciter is the usual and well known type of Tirrill regulator, comprising the vibrating contacts 11 which are adapted to be closed by either the solenoid 12 connected across the bus bars, or the solenoid 13 connected across the terminals of the exciter. The closing of these contacts deënergizes the magnet 14, and the contacts 15 are then separated by the tension of the coöperating spring. This regulator is of the usual construction and forms no part of my present invention.

Connected across the bus bars 8 is a circuit in which is included a solenoid 16. The armature of this solenoid is connected to one side of a movable contact member 17 and is adapted to move such member into engagement with either of the fixed contacts 18 or 19, according as the voltage on the bus bars falls or rises. A pivoted counter-balanced catch 20 is adapted to permanently hold the contact member 17 in engagement with either of the contacts 18 or 19. A relay circuit, in which is located a solenoid 21, is closed by the engagement of the contact member 17 with either of the contacts 18 or 19. When these contacts are in engagement, the solenoid 21 becomes energized and its armature operates the double throw switch 22. The movable contacting member of this switch is connected to the terminals of the generator field and the two sets of stationary contacting members are connected respectively to the terminals of the exciter and to a separate and independent source of excitation for the generator field. In Fig. 1 of the drawings, I have shown this separate source of excitation as the generator itself, in which case it is evident that the latter will operate as a self-excited machine when the second source of excitation is substituted for the exciter by the operation of the switch 22. It is evident that I may use any external source as a second means of excitation, and in Fig. 2 I have shown a storage battery C for this purpose. The switch 22 is thus arranged to connect the exciter to the generator field in one position, and in the other position to connect the generator field to another source of excitation. Resistances 23 are connected across the opposite poles of the switch to prevent undue sparking during the operation of the latter.

The operation of my device is as follows: When from any cause whatever, for example, the fusing together of the contacts 11 or the breaking of a wire in the automatic regulator of the exciter, the voltage on the bus bars rises above a normal maximum or falls below a normal minimum, the armature of solenoid 16 will move contact member 17 into engagement with contact 19 or 18 respectively, and thus close the relay circuit and energize solenoid 21. The energization of this solenoid operates the double throw switch 22 and disconnects the exciter from the generator field and simultaneously connects the latter to the second source of excitation which is unaffected by the automatic regulator in question. Preferably this second source of excitation is the generator itself and under these conditions the machine is self-excited. The arms of the catch 20 engage the contact member 17 and hold it firmly in engagement with either the contact 19 or 18, as the case may be, until it is manually released. The second source of excitation is thus permanently connected to the generator field terminals, and an opportunity is given to discover the fault in the automatic regulator. When this has been remedied, the catch 20 is released from engagement with the contact member 17 and the system is again restored to its normal condition of operation.

It is evident that my invention is not only adapted to be used to prevent the injurious effects of abnormal conditions of voltage, but also to prevent the effects of any abnormal electrical condition on the system, as for example, abnormal conditions of current.

What I claim as new, and desire to secure by Letters Patent of the United States, is:—

1. In a control system, an electric generator, two sources of excitation therefor, means for automatically controlling the voltage of one of said sources to regulate the voltage of said generator in the desired manner, the other source being unaffected by said means, and automatic means for shifting from said controlled source to the other source on a failure of said first-named means.

2. In a control system, an electric generator, a normally disconnected unregulated source of excitation, a normally connected regulable voltage source of excitation, automatic means for controlling said latter source to regulate the voltage of said generator in the desired manner, and other means for automatically disconnecting said regular voltage source and connecting said unregulated source to said generator field on an abnormal change of voltage of said generator resulting from a failure of said first-named means.

3. In a control system, an electric generator, an exciter normally energizing the field thereof, automatic means controlling said exciter to regulate the voltage of said generator in the desired manner, and other means responsive to an abnormal voltage on said generator, resulting from a failure of said automatic means, for shifting the energization of said generator field to self-excitation.

4. In a control system, an electric generator, a normally disconnected unregulated source of excitation, a normally connected regulable voltage source of excitation, automatic means for controlling said latter source to regulate the voltage of said generator in the desired manner, and electromagnetically operated means for automatically disconnecting said regulable voltage source and connecting said unregulated source to said generator field on an abnormal change of voltage of said generator, resulting from a failure of said first-named means.

5. In a control system, an electric generator, an exciter normally energizing the field thereof, automatic means controlling said exciter to regulate the voltage of said generator in the desired manner, and an electromagnetically operated switch, responsive to an abnormal voltage on said generator, resulting from a failure of said automatic means, for shifting the energization of said generator field to self-excitation, and holding it there.

In witness whereof, I have hereunto set my hand this 20th day of February, 1912.

HARRY A. LAYCOCK.

Witnesses:
BENJAMIN B. HULL,
HELEN OXFORD.